(12) United States Patent
Gall et al.

(10) Patent No.: US 8,196,860 B2
(45) Date of Patent: Jun. 12, 2012

(54) AIRCRAFT HAVING REDUCED ENVIRONMENTAL IMPACT

(75) Inventors: Pierre-Emmanuel Gall, Toulouse (FR); Christophe Cros, l'Union (FR)

(73) Assignee: Airbus Operations SAS, Toulouse (FR)

( * ) Notice: Subject to any disclaimer, the term of this patent is extended or adjusted under 35 U.S.C. 154(b) by 986 days.

(21) Appl. No.: 12/162,756

(22) PCT Filed: Mar. 15, 2007

(86) PCT No.: PCT/FR2007/000447
§ 371 (c)(1),
(2), (4) Date: Jul. 30, 2008

(87) PCT Pub. No.: WO2007/107647
PCT Pub. Date: Sep. 27, 2007

(65) Prior Publication Data
US 2009/0020643 A1    Jan. 22, 2009

(30) Foreign Application Priority Data
Mar. 20, 2006 (FR) ...................................... 06 02405

(51) Int. Cl.
*B64C 5/02* (2006.01)
*B64D 27/00* (2006.01)
(52) U.S. Cl. .............................. 244/55; 244/1 N; 244/87
(58) Field of Classification Search .................. 244/1 N, 244/12.1, 12.2, 12.6, 17.21, 23 B, 45 R, 53 R, 244/54, 55, 62, 87, 91; D12/319, 338, 339, D12/344
See application file for complete search history.

(56) References Cited

U.S. PATENT DOCUMENTS

| 3,652,035 | A | | 3/1972 | Fredericks |
| 3,684,217 | A | * | 8/1972 | Kukon et al. .................... 244/36 |
| 3,936,017 | A | * | 2/1976 | Blythe et al. .................... 244/55 |
| 4,447,022 | A | * | 5/1984 | Lion ............................ 244/45 R |
| 4,766,723 | A | * | 8/1987 | Newton ........................... 60/797 |
| 4,767,083 | A | * | 8/1988 | Koenig et al. ................... 244/55 |
| 4,896,160 | A | * | 1/1990 | Miller, Jr. ..................... 342/368 |
| 6,196,498 | B1 | * | 3/2001 | Eichstedt et al. .............. 244/25 |
| 2008/0073459 | A1 | | 3/2008 | Cazals |

FOREIGN PATENT DOCUMENTS

FR    2 873 096    1/2006

OTHER PUBLICATIONS

International Search Report dated Jun. 31, 2007 w/ English translation.
Written Opinion of the ISA w/ English translation.
Steinke S: "Aus Der Trickkiste Der Flugzeugentwickler Airbus-Konzepte Fuer Uebermorgen" Flug Revue, Stuttgart, DE, vol. 1/2001, Jan. 2001, pp. 22-25, XP009053625, figures.

* cited by examiner

*Primary Examiner* — Tien Dinh
*Assistant Examiner* — Richard R Green
(74) *Attorney, Agent, or Firm* — Dickinson Wright PLLC

(57) ABSTRACT

An aircraft having reduced environmental impact includes at least one engine with at least one propeller carried, at the rear, on the top of the aircraft with the propeller(s) located in vertical alignment with the rear part of a noise barrier cell and the rear face of a burst zone situated forward of the central part of an empennage box.

10 Claims, 4 Drawing Sheets

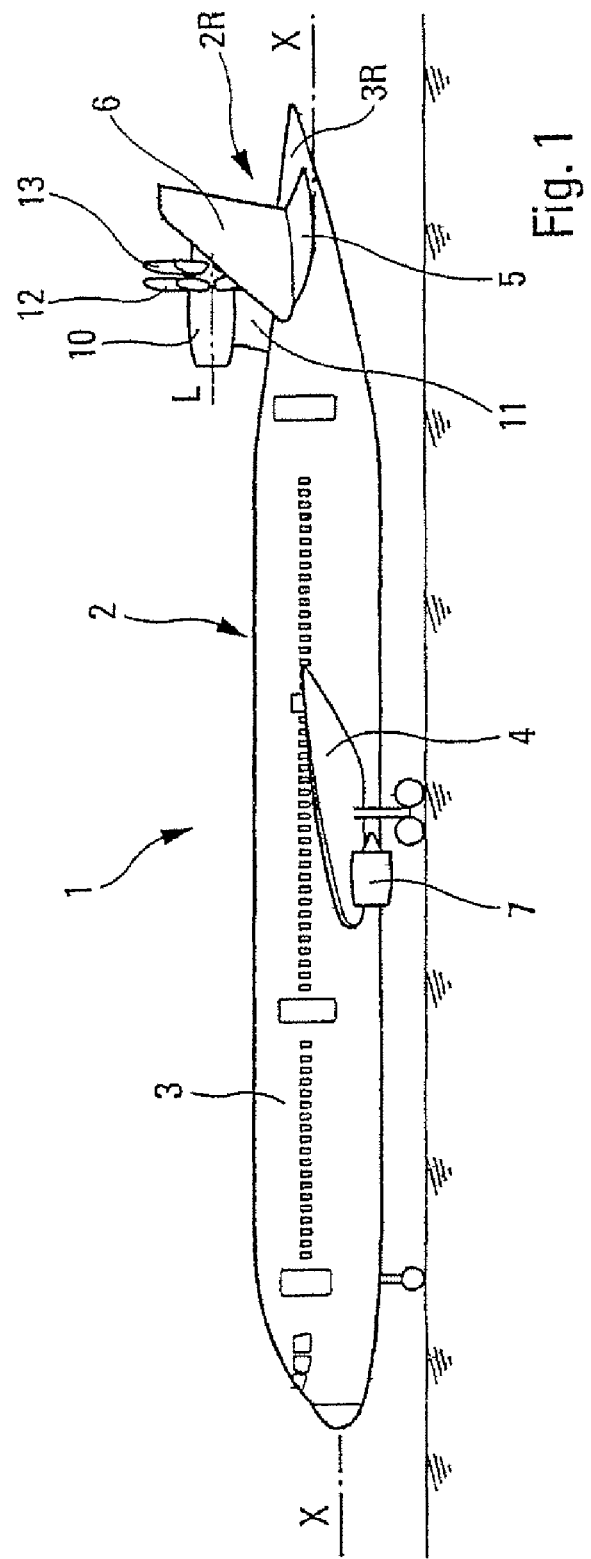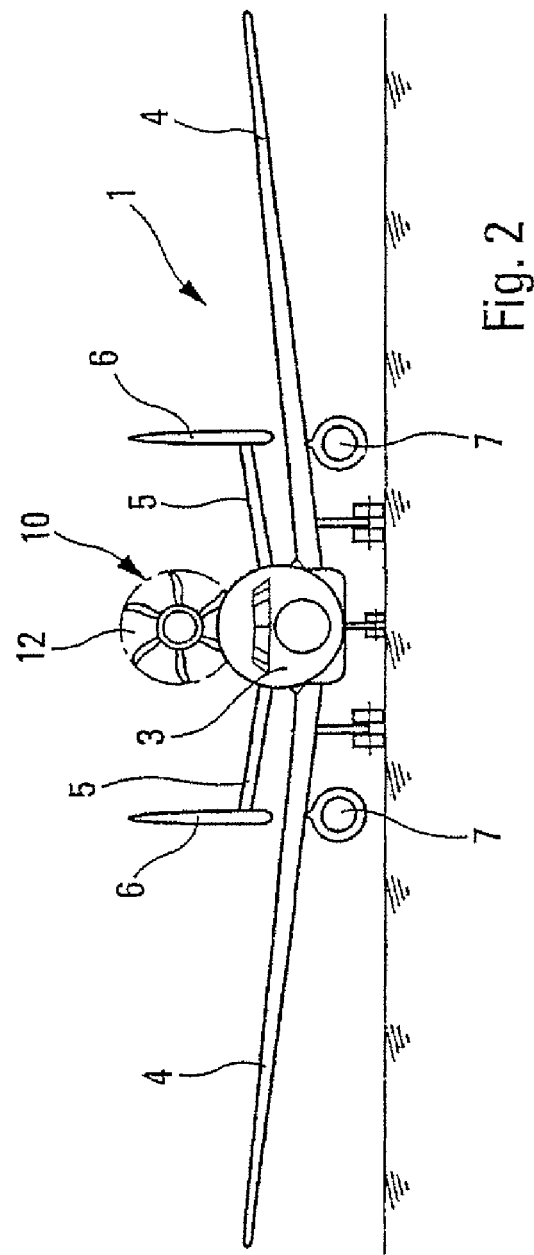

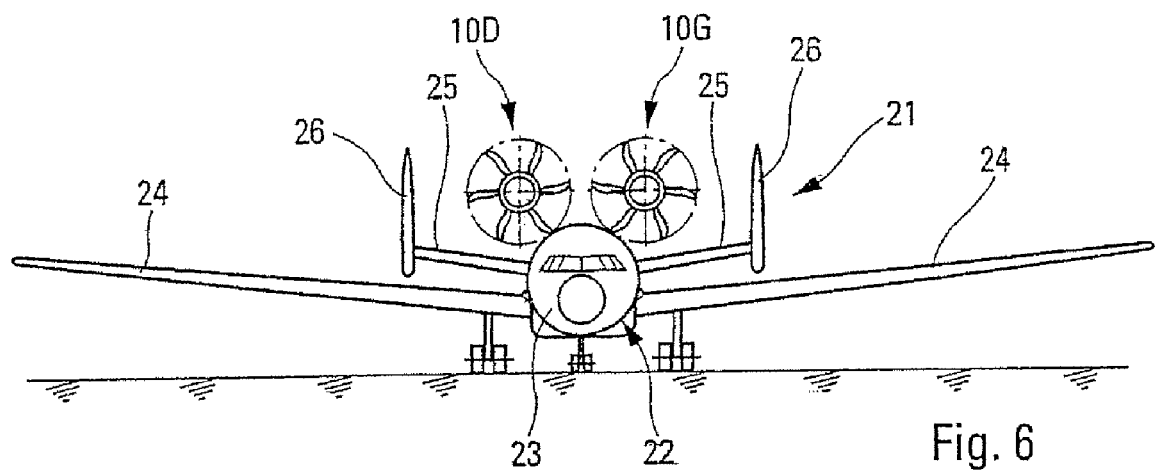
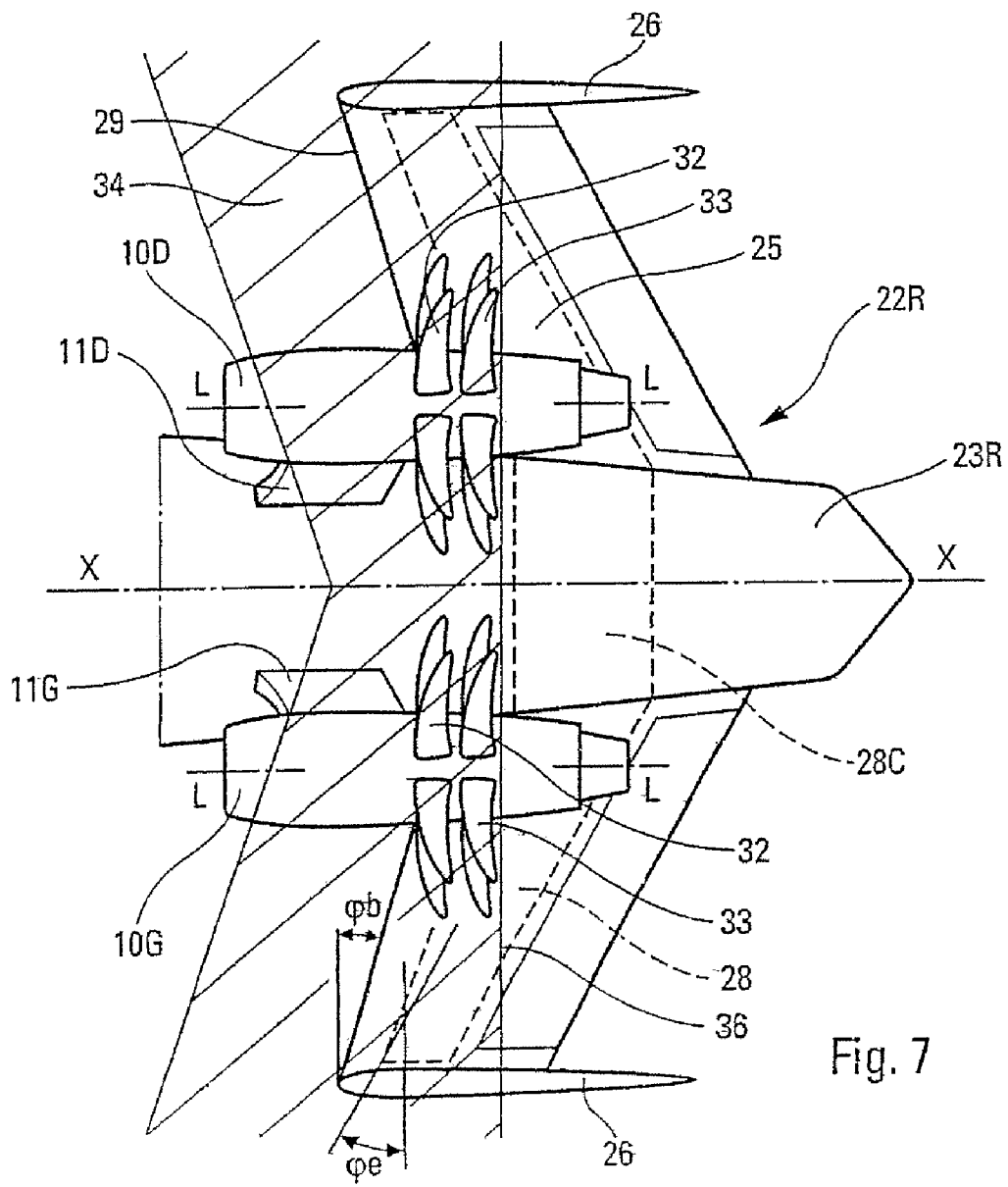

AIRCRAFT HAVING REDUCED ENVIRONMENTAL IMPACT

FIELD OF THE INVENTION

The present invention relates to an aircraft of reduced environmental impact.

BACKGROUND OF THE INVENTION

French patent application no. 05 11176, filed on Nov. 3, 2005 in the name of the applicant company describes an aircraft with low fuel consumption which produces little pollution, and which, particularly upon take off and landing, emits only small amounts of noise toward the ground. An aircraft such as this comprises at least one propeller engine, preferably unducted, mounted at the rear of the aircraft, on the back thereof, with its axis at least substantially parallel to the longitudinal axis of the said aircraft. An engine such as this may, for example, be a turboprop with a single propeller or alternatively may be a prop fan with contra-rotating propeller and fan. In addition, the cell of the said aircraft, the rear part of which comprises a horizontal tail plane and two vertical tail planes, these being positioned one at each end of the said horizontal tail plane, is such that the said rear part acts as a barrier to the downwardly and sideways directed engine noise, the said propeller(s) being positioned vertically in line with the said rear part.

An anti-noise barrier such as this formed by the said rear part of the cell is particularly efficient because the noise of a propeller is highly directional, the maximum amount of noise being perceived near the plane of the propeller and the noise reducing sharply with increasing distance away from this plane.

Furthermore, in this aircraft, the said propeller(s) is(are) preferably positioned at the rear of the said engine and is(are) capable of exerting thrust on the said aircraft. Thus, the prop(s) is(are) located at a small cross-section part of the aircraft fuselage, thus leaving more space for installing it(them). In addition, the propeller(s) is(are) thus kept away from the passenger cabin, and this is beneficial for passenger comfort.

Thus, with such arrangements, the situation may arise that, if a rotary part of the turbomachine(s) ruptures in an uncontained manner and/or part of the propeller(s) ruptures, debris from these can damage, and even destroy, the horizontal tail plane (and especially the tail box which supports it and which is located at the rear part of the cell) and the vertical tail planes, leading to loss of the aircraft.

Of course, in order to overcome such a disadvantage, it might be possible to conceive of duplicating, strengthening and/or protecting the structure of the said rear part of the cell, but such steps would increase the mass and cost of the aircraft, and at the same time would be detrimental to performance.

Hence, it is an object of the present invention to improve the abovementioned aircraft, at lower cost, without increasing the mass and without reducing the effectiveness of the anti-noise barrier formed by the rear part of its cell.

SUMMARY OF THE INVENTION

To this end, according to the invention, the aircraft of reduced environmental impact, having a longitudinal axis and comprising:
at least one engine which comprises at least one propeller positioned behind the said engine and able to exert thrust on the said aircraft and which is mounted at the rear of the said aircraft, on the back thereof, the axis of the said engine being at least substantially parallel to the said longitudinal axis of the aircraft, the said engine and the said propeller being such that, should they shatter, their debris would follow paths contained in a shatter region aligned with the said axis of the engine and delimited, transversely to the latter axis, by a front boundary and by a rear boundary; and
a cell the rear part of which comprises a horizontal tail plane and two vertical tail planes positioned one at each end of the said horizontal tail plane, the said rear part of the cell comprising a tail box supporting the said horizontal tail plane and the said propeller being positioned vertically in line with the said rear part of the cell so that the latter forms an anti-noise barrier at least in respect of the downwardly directed engine noise, is notable in that:
the said engine is mounted on the said rear part of the cell in such a way that the said rear boundary of the shatter region is located forward of the central part of the said tail box; and
the said horizontal tail plane is swept forward.

Thus, by virtue of the present invention, the engine or engines is or are moved forward along the said rear part of the cell so that, if they should shatter, their debris and debris from the propeller(s) cannot excessively damage the functionalities of the horizontal and vertical tail planes. Furthermore, the anti-noise barrier formed by this rear part of the cell does not suffer from any drop in performance by moving the engine or engines forward because the horizontal tail plane now faces forward because it is swept forward, something which also, incidentally, moves the vertical tail planes forward. As far as the anti-noise barrier is concerned, moving the engine(s) forward is therefore compensated for by the forward sweep of the horizontal tail plane, the root of which can be positioned at the same point as that of the horizontal tail plane of the earlier aircraft described hereinabove.

Of course, in this earlier aircraft and also in the aircraft of the present invention, each engine is mounted on the back of the aircraft via a fixing system, for example of the pylori or similar type.

According to another important specific of the present invention, a fixing system such as this is also positioned forward of the central part of the said tail box.

Thus, the said tail box is entirely independent of the said fixing system which means that the said horizontal tail plane can be of the type the angle of incidence of which can be adjusted, generally known as a THS (Trimmable Horizontal Stabilizer) type known in French as a PHR (Plan Horizontal Reglable).

In one advantageous embodiment of the present invention, the said rear part of the cell and the said forward sweep are designed to act as a barrier, on each side of the plane of the propeller(s), to all of that proportion of the noise that has an acoustic intensity higher than a predetermined fraction of the maximum intensity emitted by the said engine. For example, the acoustic intensity shrouded by the said rear part of the cell on each side of the said plane is equal to at least approximately −5 dB with respect to the said maximum intensity.

Such a proportion of the noise forms, in the known way, a noise zone aligned with the axis of the engine and delimited, transversely to this axis, by a front boundary and a rear boundary. It is then advantageous for the forward-swept leading edge of the said horizontal tail plane to at least approximately follow the line of the said front boundary of the said noise zone. Thus it is possible to maximize the noise shrouding potential for a given relative position of the said propeller engine with respect to the root of the forward-swept horizontal tail plane.

Experience has shown that the angles at which the said horizontal tail plane and the said leading edge are swept forward may advantageously be of the order of around twenty and around fifteen degrees respectively.

Of course, the aircraft according to the present invention may be a single-engined aircraft and have just one propeller engine mounted at the rear in the way described above. However, in addition to the latter engine, it may also comprise at least two turboshaft engines borne symmetrically by the wings of the said aircraft. An arrangement such as this is advantageous in so far as the tail propeller engine which has low fuel consumption and is not very noisy because of the anti-noise shroud formed by the rear part of the cell makes it possible to reduce the power (and therefore the noise and fuel consumption) of the wing-mounted turboshaft engines.

However, in a preferred embodiment of the aircraft according to the present invention, two propeller engines positioned side by side at the rear of the aircraft with their axes parallel are provided.

BRIEF DESCRIPTION OF THE DRAWINGS

The figures of the attached drawing will make it easy to understand how the invention may be embodied. In these figures, identical references denote elements which are similar.

FIGS. 1 and 2 schematically illustrate a first embodiment of the aircraft according to the present invention, seen in side view and in front view, respectively.

FIGS. 6 and 7 schematically illustrate a preferred embodiment of the aircraft according to the present invention, seen in a front view and an enlarged partial top view, respectively.

DETAILED DESCRIPTION OF THE INVENTION

Figure 3:
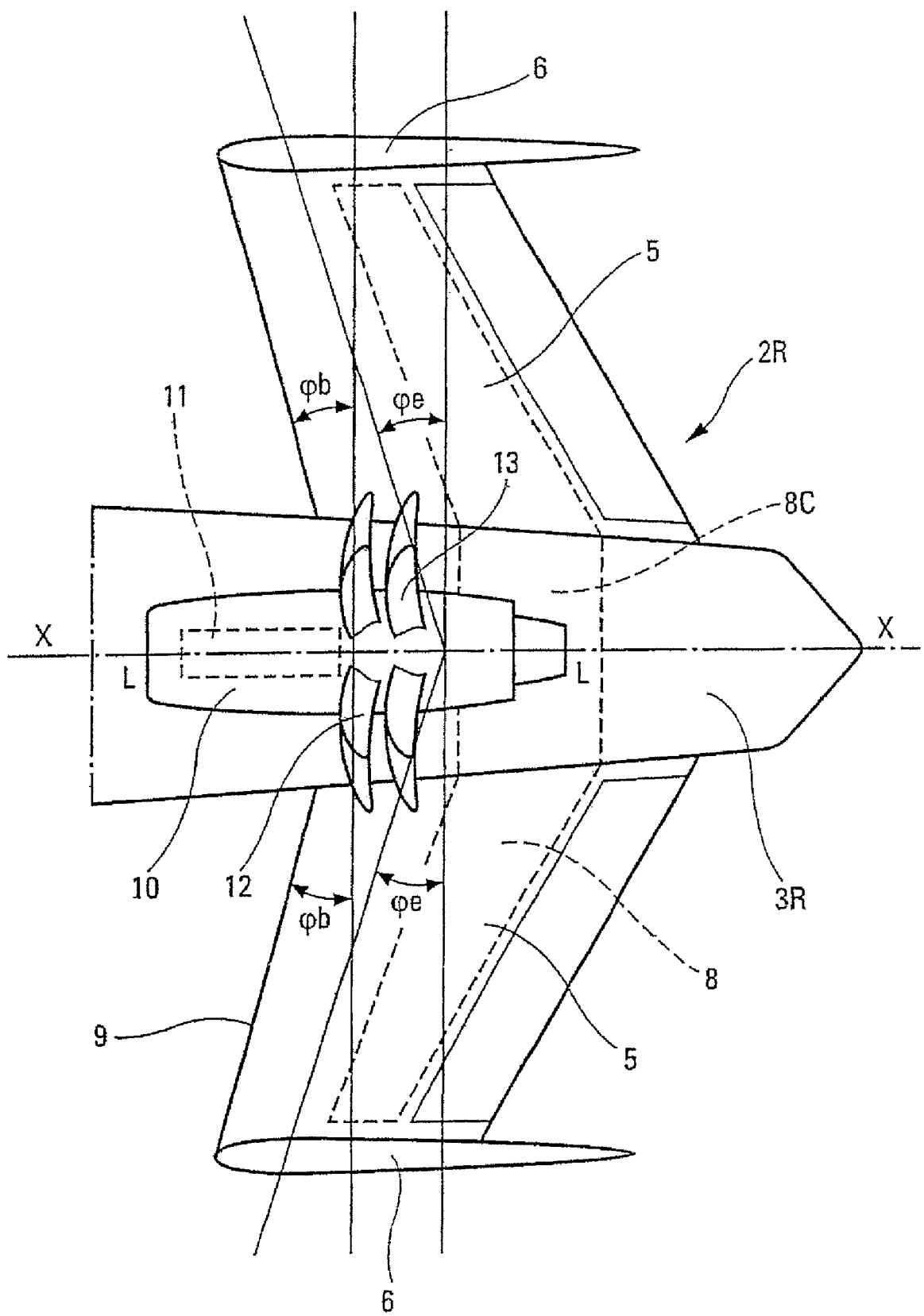
FIG. 3 is a schematic top view, on a larger scale, of the rear part of the aircraft of FIGS. 1 and 2.

The commercial airplane 1, according to the invention and depicted schematically in FIGS. 1 to 3 has a longitudinal axis X-X and comprises a cell 2 which consists of a fuselage 3, wings 4, a horizontal tail plane 5 and two vertical tail planes 6. The wings 4 each bear a turboprop engine 7 and the vertical tail planes 6 are positioned at the ends of the horizontal tail plane 5.

This horizontal tail plane 5 is of the known THS (or PHR) type with variable angle of inclination and is supported by a tail box 8, the central part 8C of which is housed inside the rear part 3R of the fuselage 3. In addition, the horizontal tail plane 5 is swept forward at an angle φe. Likewise, the leading edge 9 of the horizontal tail plane 5 is swept forward at an angle φb.

At the rear part 2R of the cell 2 (which rear part 2R comprises the rear part 3R of the fuselage 3, the horizontal tail plane 5 and the vertical tail plane 6) is mounted a propeller engine 10 positioned on the back of the said rear part 3R of the fuselage 3 with its axis L-L parallel to the longitudinal axis X-X of the airplane 1 and positioned in the same vertical plane. The engine 10 is supported by a strut 11 or the like positioned forward of the central part 8C of the tail box 8. At its rear, the engine 10 has two unducted contra-rotating propeller(s) 12 and 13 positioned vertically in line with the said horizontal tail plane 5.

Figure 4:
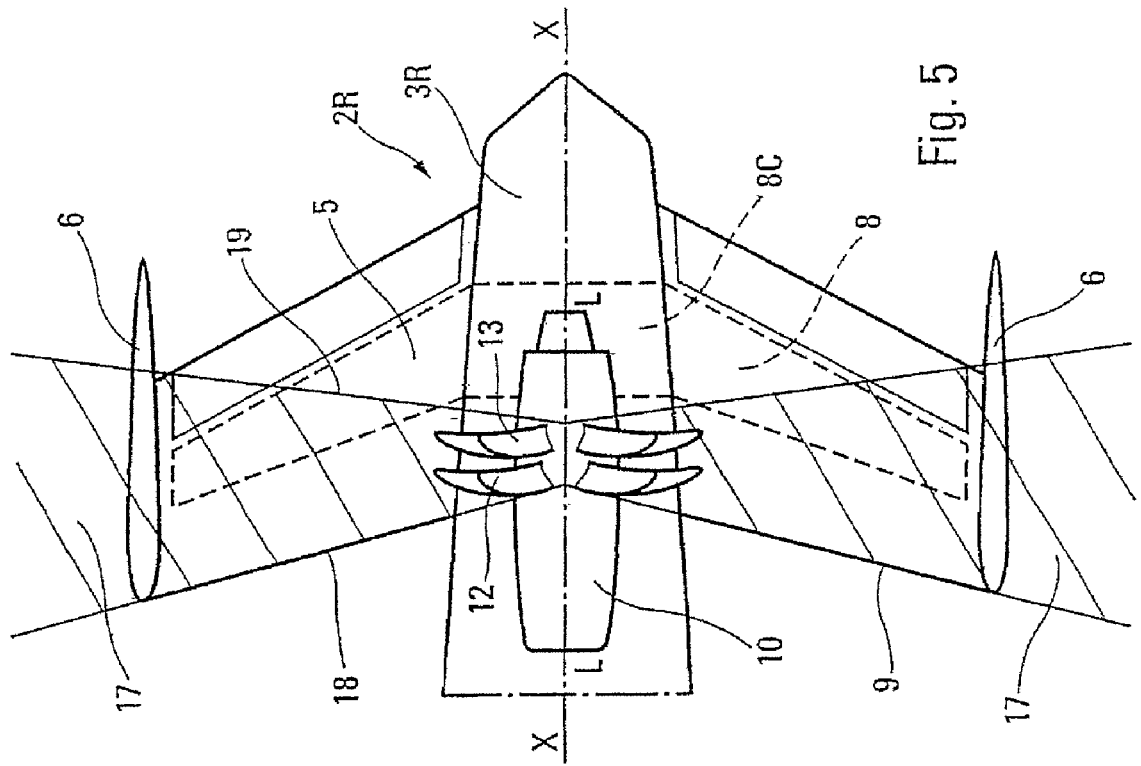
FIGS. 4 and 5 are schematic top views corresponding to FIG. 3 and respectively illustrating the protection of the tail plane against a shattering of the engine or of the propeller(s) and the shrouding of the noise from the propeller engine.

If, while the engine 10 is running and the propeller(s) 12 and 13 are turning one should shatter, debris from the said engine and/or from the said propeller(s) would follow paths contained inside a shatter region 14 aligned with the axis L-L of the said engine and delimited, transversely to the said axis, by a front boundary 15 and a rear boundary 16 (see FIG. 4).

As shown by FIG. 4, the engine 10 is mounted at the rear part 2R of the cell 2 so that the said rear boundary 16 of the shatter region 14 lies forward of the central part 8C of the tail box 8.

Thus, should the engine 10 and/or the propeller(s) 12, 13 shatter, the tail box would not be completely damaged, there being merely a risk of part of the tail planes 5 and 6 becoming damaged.

In addition, in operation, each of the said propeller(s) 12 and 13 generates noise the acoustic intensity of which is at a maximum near its plane and which decreases sharply with increasing separation therefrom along the axis L-L. In this instance, the propeller(s) 12 and 13 generate, about the said axes L-L, an overall noise the maximum acoustic intensity of which is on a substantially flat surface passing between the propeller(s) 12 and 13. A noise zone 17 aligned with the axis L-L of the engine 10 and delimited, transversely to this latter axis, by a front boundary 18 and a rear boundary 19 has been depicted in FIG. 5, the acoustic intensity in this noise zone 17 being for example equal to −5 dB with respect to the said maximum acoustic intensity (see FIG. 5).

Figure 5:
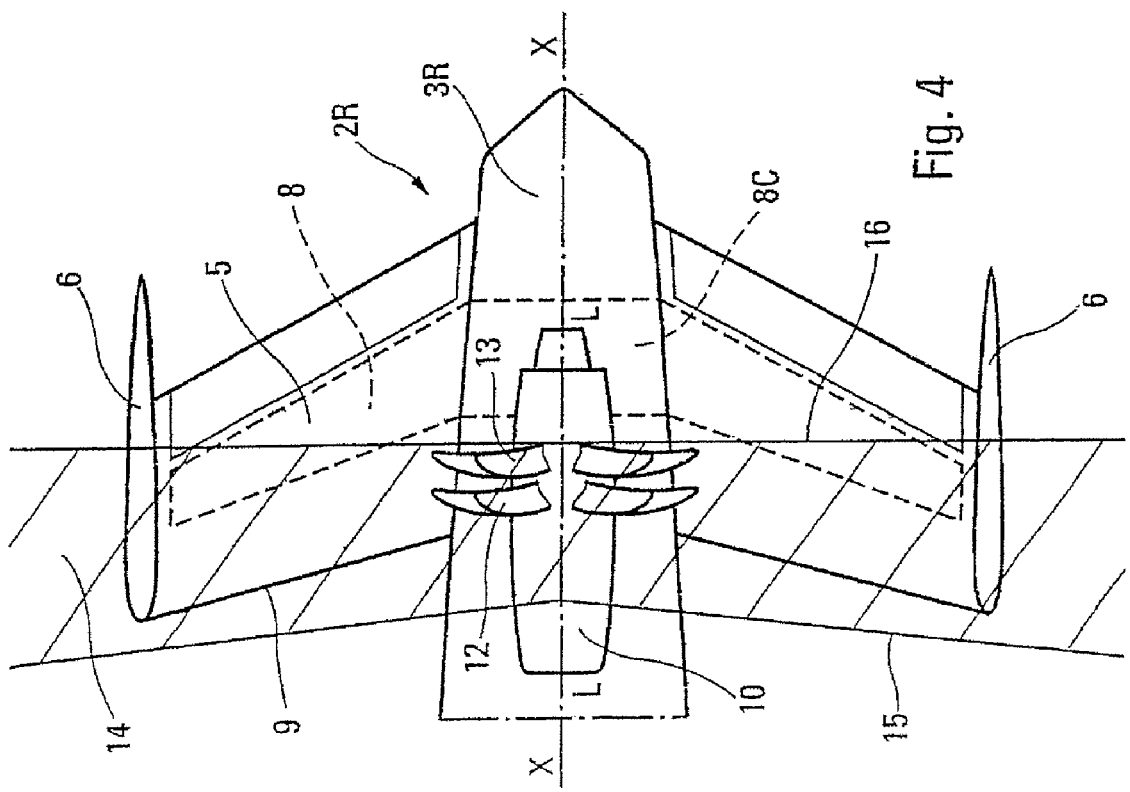

As can be seen from FIG. 5, the relative layout of the propeller(s) 12, 13, of the horizontal tail plane 5 and of the vertical tail planes 6 is such that, in the vicinity of the said engine 10, the said noise zone 17 lies inside the passage formed by the said horizontal 5 and vertical 6 tail planes. In the layout depicted in FIG. 5, the leading edge 9 of the horizontal tail plane 5 lies at least approximately in the front boundary 18 of the noise zone 17.

Thus, the noise emitted by the engine 10 is shrouded, in the downward direction, by the horizontal tail plane 5 and, in part, sideways, by the vertical tail planes 6.

As a result, upon take off and landing the noise emitted by the engine 10 of the airplane 1 toward the ground is greatly reduced because it is shrouded by the horizontal tail plane 5 and, in part, by the vertical tail planes 6.

It will be noted that, by comparison with a conventional twin-turboshaft-engine airplane of the same performance, the airplane 1 can use turboprop engines 7 that are less powerful (and therefore less noisy) because of the presence of the engine 10 in the tail. Overall, the airplane 1 can therefore be less noisy and have a lower fuel consumption than a twin-turboshaft-engine airplane such as this.

The commercial airplane 21 according to the present invention and depicted schematically by FIGS. 6 and 7 also has a longitudinal axis X-X and comprises a cell 22 consisting of a fuselage 23, wings 24, a horizontal tail plane 25 and two vertical tail planes 26 positioned at the ends of the horizontal tail plane 25.

The wings 24 do not bear any turboshaft engine. Just like the horizontal tail plane 5, the horizontal tail plane 25 is of the THS (PHR) type and is supported by a tail box 28 of which the central part 28C is housed inside the rear part 23R of the fuselage 23. The horizontal tail plane 25 and its leading edge 26 are swept forward at angles φe and φb respectively.

Mounted, as a matter of course, at the rear part 22R of the cell 22 (which rear part 22R comprises the rear part 23R of the fuselage 23, the horizontal tail plane 25 and the vertical tail planes 26) are two propeller engines 10G and 10D positioned one beside the other on the back of the said rear part 23R of the fuselage 23 with their axes L-L parallel to the longitudinal axis X-X of the airplane 21. The engines 10G and 10D are borne by struts 11G and 11D or the like, respectively, positioned forward of the central part 28C of the tail box 28. At their rear, the engines 10G and 10D have two, unducted, contra-rotating propeller(s) 32 and 33 positioned vertically aligned with the said horizontal tail plane 25.

In a similar way to that which was described hereinabove with respect to the airplane 1:

the engines 10G and 10D are mounted on the rear part 22R of the cell 22 so that the rear boundary 36 of the overall shatter region 34 accounting for both of these engines lies forward of the central part 28C of the tail box 28 (just like the rear boundary 16 of the shatter region 14 lies forward of the central part 8C of the tail box 8);

the rear part 22R of the cell 22 and the angle φe at which the horizontal tail plane 25 is swept forward are designed to act as a barrier, on each side of the plane of the propeller(s) 32, 33, to all of that proportion of the overall noise of the engines 10G, 10D that is of an acoustic intensity greater than a predetermined fraction of the maximum intensity emitted by the said engines;

the acoustic intensity shrouded by the said rear part of the cell on each side of the plane of the propeller(s) is equal to at least approximately −5 dB with respect to the maximum intensity; and the forward-swept leading edge 29 of the said horizontal tail plane 25 at least approximately follows the line of the said front boundary of the overall noise zone of the engines 10G and 10D.

In particular in the exemplary embodiment of FIGS. 6 and 7 it has proved advantageous for the angle φe at which the horizontal tail plane 25 is swept forward to be of the order of 20 degrees while the angle φb at which the leading edge 29 is swept forward was of the order of 15 degrees.

The invention claimed is:

1. Aircraft of reduced environmental impact, having a longitudinal axis and comprising:

at least one engine which comprises at least one propeller positioned behind said engine and able to exert thrust on said aircraft and which is mounted at the rear of said aircraft, on the back thereof, the axis of said engine being at least substantially parallel to said longitudinal axis of the aircraft, said engine and said propeller being such that, should they shatter, their debris would follow paths contained in a shatter region aligned with said axis of the engine and delimited, transversely to the latter axis, by a front boundary and by a rear boundary; and a cell the rear part of which comprises a horizontal tail plane and two vertical tail planes positioned one at each end of said horizontal tail plane, said rear part of the cell comprising a tail box supporting said horizontal tail plane and said propeller being positioned vertically in line with said rear part of the cell so that the latter forms an anti-noise barrier at least in respect of the downwardly directed engine noise, wherein:

said engine is mounted on said rear part of the cell in such a way that the rear boundary of the shatter region is located forward of the central part of said tail box and the forward boundary is located forward of the leading edge of said horizontal tail plane; and said horizontal tail plane is swept forward at an angle.

2. Aircraft according to claim 1, wherein a fixing system for attaching the engine to said rear part of the cell is also positioned forward of the central part of said tail box.

3. Aircraft according to claim 2, wherein the angle of inclination of said forward-swept horizontal tail plane is adjustable.

4. Aircraft according to claim 1, wherein said rear part of the cell and the forward sweep of the horizontal tail plane are designed to reduce the noise emitted by said engine.

5. Aircraft according to claim 4, wherein the acoustic intensity shrouded by said rear part of the cell on each side of the plane of the propeller is equal to at least approximately −5 dB with respect to said maximum intensity.

6. Aircraft according to claim 4, in which said proportion of the noise forms a noise zone aligned with said axis of said engine and delimited, transversely to this axis, by a front boundary and a rear boundary, wherein the forward-swept leading edge of said horizontal tail plane at least approximately follows the line of said front boundary of said noise zone.

7. Aircraft according to claim 6, wherein the angle at which said leading edge of the horizontal tail plane is swept forward is around fifteen degrees.

8. Aircraft according to claim 1, wherein the angle at which said horizontal tail plane is swept forward is around twenty degrees.

9. Aircraft according to claim 1, wherein the aircraft comprises a single propeller engine mounted at the rear and at least two turboshaft engines borne symmetrically by the wings of said aircraft.

10. Aircraft according to claim 1, wherein the aircraft comprises at least two such propeller engines mounted at the rear of the aircraft, on the back thereof and positioned one beside the other with their axes parallel.

* * * * *